(No Model.)

T. J. BYRNS.
NUT LOCK.

No. 536,777.

Patented Apr. 2, 1895.

Witnesses
J. W. Reynolds
Chas. B. Hyer

Inventor
Thomas J. Byrns
By John Wedderburn
Attorney

United States Patent Office.

THOMAS J. BYRNS, OF PHILADELPHIA, PENNSYLVANIA, ASSIGNOR OF ONE-HALF TO JOHN F. BYRNS, OF SAME PLACE.

NUT-LOCK.

SPECIFICATION forming part of Letters Patent No. 536,777, dated April 2, 1895.

Application filed June 4, 1894. Serial No. 513,420. (No model.)

*To all whom it may concern:*

Be it known that I, THOMAS J. BYRNS, a citizen of the United States, and a resident of Philadelphia, in the county of Philadelphia and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut locks for use in connection with fish-plates on railroad rails, handles on drawers of desks, bureaus, &c., and in the construction of bridges or wherever such a device can be used, and has for its object to prevent the loosening of nuts and one wherein the slightest vibration of the bolt in either direction will cause either one of two nuts employed to tighten instead of loosen.

With these and other objects in view, the invention consists of the construction of the several parts which will be more fully hereinafter described and claimed.

Figure 1:
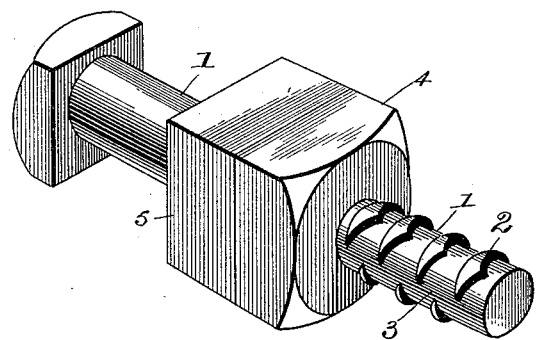
Figure 2:
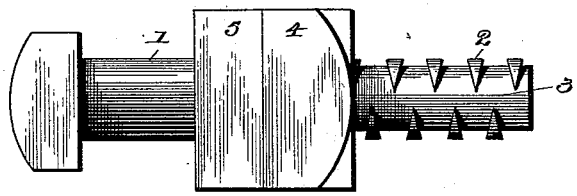
Figure 3:
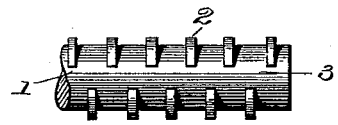

In the drawings:—Figure 1 is a perspective view of a bolt and nuts embodying the invention. Fig. 2 is a top plan view of the device as shown in Fig. 1, in a different position. Fig. 3 is a modified form of construction of bolt, showing the threads of square form.

Similar numerals of reference are employed to indicate corresponding parts in the several views.

Referring to the drawings, the numeral 1 designates a bolt which may be of any length or dimension and provided with either a head, handle or other device in accordance with the use of the same. As shown in Figs. 1 and 2, the said bolt is provided with double cross-threads 2 intersected at top and bottom by a space 3 formed by the threads terminating short of the full circumference at top and bottom. The threads on one side have their terminating points opposite the spaces between the threads on the opposite side and as shown in Figs. 1, and 2, the said threads are of double V-form, being widest at their central portion and tapered toward opposite ends. As shown in Fig. 3 the threads are square but the remaining construction is similar, to that shown in Fig. 1. Engaging the said threads of the bolt is a right screw-threaded nut 4 and a left screw-threaded nut 5.

By the construction and arrangement of the several parts, it will be seen that any tendency of the bolt to move, from vibration or other cause will tighten the nuts and prevent withdrawal or loosening of the bolt, thereby adapting the device not only for use with mechanical devices or for holding fish-plates in position, as well as connecting the several parts of bridges, but also forming a useful construction for the handles of drawers, desks, bureaus and other articles of furniture.

Having thus described the invention, what is claimed as new is—

1. A nut and bolt lock comprising a bolt having a thread removed on longitudinal lines on diametrically opposite sides to provide longitudinal spaces, the ends of the thread sections bordering on the said spaces being respectively disposed opposite the spaces between the ends of the opposing thread sections, the said bolt being thereby adapted to receive a right and a left threaded nut, substantially as described.

2. A nut and bolt lock comprising a bolt adapted to receive a right and a left threaded nut, having a thread removed on longitudinal lines on diametrically opposite sides, to provide longitudinal spaces, the ends of the thread sections bordering on the said spaces being respectively disposed opposite the spaces between the ends of the opposing thread sections, the latter tapering from the middle toward each end, substantially as described and for the purposes specified.

In testimony whereof I have signed this specification in the presence of two subscribing witnesses.

THOMAS J. BYRNS.

Witnesses:
 JOHN F. BYRNS,
 JOHN FITZPATRICK.